Patented July 28, 1953

2,647,111

UNITED STATES PATENT OFFICE 2,647,111

POLYMERIZATION OF STYRENE

Tevis Shusman, Longmeadow, Mass., assignor to Monsanto Chemical Company, St. Louis, Mo., a corporation of Delaware No Drawing. Application December 6, 1950, Serial No. 199,559

7 Claims. (Cl. 260—93.5)

This invention relates to the polymerization of vinyl aromatic monomers. More particularly it relates to a new catalyst system for the mass polymerization of monomers containing a major proportion of a vinyl aromatic compound.

One of the major problems in the preparation of polymers by mass polymerizing vinyl aromatic compounds such as styrene is to reduce the amount of residual monomer and methanol soluble impurities to a minimum. These impurities, if left in the polymer, lower the heat distortion temperatures thereof, produce surface defects on objects molded from the polymer and tend to accelerate crazing and yellowing on aging or exposure to light. Various methods have been proposed to reduce the amount of impurities in the polymer such as milling on hot rolls, thermal vacuum treatment, hot extrusion with the addition of peroxides, etc.

One object of this invention is to produce a polymeric vinyl aromatic compound having a minimum of residual monomer and methanol soluble impurities.

Another object is to provide a new catalyst system for the mass polymerization of vinyl aromatic compounds.

These and other objects are attained by using a combination of di-(tertiary butyl) peroxide and tertiary butyl peracetate as the catalyst for the mass polymerization of vinyl aromatic compounds and mixtures thereof with vinylidene compounds in which mixtures the vinyl aromatic compound constitutes a major proportion by weight.

The following examples are given in illustration and are not intended as limitations of the scope of this invention. Where parts are mentioned they are parts by weight.

Example I

Purified styrene monomer was polymerized at 90° C. until about 30% conversion was obtained. Thereafter the temperature was raised gradually to about 190° C. over a period of 6 hours. This was followed by a final polymerization step at 190° C. for 4 hours. Two catalysts were used in separate tests. In one, the catalyst was 0.02 part of di-(tertiary butyl) peroxide per 100 parts of styrene and in the other the catalyst was 0.02 part of tertiary butyl peracetate. The results obtained in terms of residual monomer and methanol solubles are set forth in Table I.

TABLE I

| Catalyst | Residual Monomer (Percent) | Methanol Solubles (Percent) |
|---|---|---|
| Di-(tertiary butyl) peroxide | 1.94 | 3.76 |
| Tertiary butyl peracetate | 0.73 | 2.40 |

The amounts of residual monomer and methanol solubles obtained in the above example as shown in Table I are above the tolerable limits. Moldings made from these polymers have pitted and uneven surfaces and tend to craze on exposure to light.

Example II

A series of experiments were run under similar temperature and time conditions as shown in Example I. In this series, various mixtures of di-(tertiary butyl) peroxide (DTBP) and tertiary butyl peracetate (TBA) were employed as catalysts along with two control tests in which the di-(tertiary butyl) peroxide was used alone. The results obtained are tabulated in Table II.

TABLE II

| DTBP* | TBA* | Residual Monomer (Percent) | Methanol Solubles (Percent) |
|---|---|---|---|
| 0.02 | ----- | 1.47 | 2.73 |
| 0.02 | 0.005 | 1.59 | 3.20 |
| 0.02 | 0.02 | 0.16 | 1.39 |
| 0.02 | 0.10 | 0.00 | 0.92 |
| 0.05 | ----- | 0.43 | 1.82 |
| 0.05 | 0.005 | 0.57 | 1.99 |
| 0.05 | 0.02 | 0.00 | 1.70 |
| 0.05 | 0.10 | 0.00 | 1.21 |

*The figures in the first two columns are parts by weight of catalyst per 100 parts of styrene monomer.

It can be seen from Table II that the addition of increasing amounts of tertiary butyl peracetate to di-(tertiary butyl) peroxide drastically reduces the amount of residual monomer even to the extent of eliminating it altogether. Accompanying the reduction in residual monomer is a large reduction in percentage of methanol solubles. Table II also shows that there is a critical amount of the peracetate which must be used to obtain the beneficial results i. e., if only 0.005 part of the tertiary butyl peracetate is used the results are worse than if none is employed, whereas if from 0.02 to 0.1 part is used the advantages are progressively greater.

If Table II is compared with Table I it may be seen that the results are quite unexpected since neither of the two catalysts alone is as effective as the combination. Furthermore, the results obtained are not merely cumulative since 0.05 part of di-(tertiary butyl) peroxide does not give as good results as a combination of 0.02 part of di-(tertiary butyl) peroxide and 0.02 part of tertiary butyl peracetate. (Table II, the third and fifth items.)

The amount of the catalysts which may be used to obtain the beneficial results of this invention may be varied within narrow limits. Thus the amount of tertiary butyl peracetate may vary from slightly less than 0.02 to about 0.15 part and the amount of di-(tertiary butyl) peroxide may be varied from about 0.02 to about 0.05 part, all per 100 parts of vinyl aromatic monomer or monomer mixture.

Advantages residing in the use of the catalysts of this invention apply not only to the polymerization of styrene but also to the polymerization of other vinyl aromatic materials, mixtures of vinyl aromatic compounds, or mixtures of vinyl aromatic compounds with substances copolymerizable therewith containing ethylenic double bonds. Particularly preferred copolymerizable materials are substances containing a vinylidene $$(CH_2=C<)$$

or vinyl 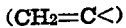

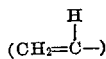

group. As examples of the vinyl aromatic materials may be mentioned para-methyl styrene, meta-ethyl styrene, propyl styrene, ethyl methyl styrene, alpha-methyl styrene, dimethyl styrenes, dichloro styrenes, ortho-chlorostyrene, para-chlorostyrene, divinyl benzenes such as para-divinyl benzene and vinyl naphthalene. Examples of copolymerizable materials include vinyl esters such as vinyl chloride and vinyl acetate; esters of unsaturated acids such as methyl acrylate, methyl methacrylate, allyl cinnamate; unsaturated hydrocarbons and their halogen derivatives such as butadiene, isobutylene, and chloroprene; aliphatic alpha-beta unsaturated acids and their anhydrides or esters such as maleic anhydride, diethyl maleate, and diethyl fumarate; and other copolymerizable compounds containing ethylenic double bonds such as tung oil and oiticica oil. In any copolymerization system, the vinyl aromatic monomer must comprise at least 50% by weight of the monomer mixture.

The process of the invention as illustrated by the examples is not limited to the specific temperature conditions set forth therein. For example, the polymerization may be conducted at a single temperature such as at 90° C. or 120° C. or various cycles may be used within a range of 75° C. to 200° C.

The catalyst combination of this invention produces polymers which are useful as molding powders for injection molding processes, extrusion processes, calendering processes etc. to produce articles which are exceptionally free of surface defects and which do not develop surface defects on aging.

It is obvious that variations may be made in the products and processes of this invention without departing from the spirit and scope thereof as defined in the appended claims.

What is claimed is:

1. In the mass polymerization of a polymerizable material containing at least 50% by weight of a vinyl aromatic compound, the step which comprises employing as a catalyst therefor a mixture of from 0.02 to 0.05 part of di-(tertiary butyl) peroxide and from 0.02 to 0.15 part of tertiary butyl peracetate per 100 parts of polymerizable material.

2. A process as defined in claim 1 in which the vinyl aromatic compound is a vinyl benzene.

3. A process as in claim 1 wherein the polymerizable compound is styrene.

4. In the mass polymerization of a polymerizable material containing at least 50% by weight of a vinyl aromatic compound, the step which comprises employing as a catalyst therefore a mixture of 0.02 part of di-(tertiary butyl) peroxide and 0.10 part of tertiary butyl peracetate per 100 parts of polymerizable material.

5. A process as in claim 4 wherein the polymerizable material is styrene.

6. In the mass polymerization of a polymerizable material containing at least 50% by weight of a vinyl aromatic compound, the step which comprises employing as a catalyst therefor a mixture of 0.05 part of di-(tertiary butyl) peroxide and 0.10 part of tertiary butyl peracetate per 100 parts of polymerizable material.

7. A process as in claim 6 wherein the polymerizable material is styrene.

TEVIS SHUSMAN.

References Cited in the file of this patent

UNITED STATES PATENTS

| Number | Name | Date |
|---|---|---|
| 2,403,709 | Dickey | July 9, 1946 |
| 2,521,754 | Shusman | Sept. 12, 1950 |